(12) United States Patent
Barros et al.

(10) Patent No.: US 12,443,445 B2
(45) Date of Patent: Oct. 14, 2025

(54) SYSTEMS AND METHODS FOR MANAGING STORAGE SPACE

(71) Applicant: MOBILEYE VISION TECHNOLOGIES LTD., Jerusalem (IL)

(72) Inventors: Yanor Barros, Jerusalem (IL); Dror Kronstein, Nataf (IL); Vladislav Zhalkin, Rishon Lezion (IL)

(73) Assignee: MOBILEYE VISION TECHNOLOGIES LTD., Jerusalem (IL)

( * ) Notice: Subject to any disclaimer, the term of this patent is extended or adjusted under 35 U.S.C. 154(b) by 638 days.

(21) Appl. No.: 17/755,064

(22) PCT Filed: Oct. 23, 2020

(86) PCT No.: PCT/IB2020/000896
§ 371 (c)(1),
(2) Date: Apr. 20, 2022

(87) PCT Pub. No.: WO2021/079191
PCT Pub. Date: Apr. 29, 2021

(65) Prior Publication Data
US 2022/0382588 A1 Dec. 1, 2022

Related U.S. Application Data

(60) Provisional application No. 62/925,385, filed on Oct. 24, 2019.

(51) Int. Cl.
*G06F 9/50* (2006.01)
*G06F 16/188* (2019.01)

(52) U.S. Cl.
CPC .......... *G06F 9/5016* (2013.01); *G06F 9/5077* (2013.01); *G06F 16/188* (2019.01)

(58) Field of Classification Search
None
See application file for complete search history.

(56) References Cited

U.S. PATENT DOCUMENTS

| | | | |
|---|---|---|---|
| 8,705,062 B2 * | 4/2014 | Ding | H04N 1/00206 358/1.13 |
| 8,839,451 B1 * | 9/2014 | Lam | G06F 21/1011 713/193 |

(Continued)

OTHER PUBLICATIONS

Red Hat: Application ephemeral storage sizing: Developer Guide: OpenShift Container Platform 3.10 Application ephemeral storage sizing Overview Background Strategy Diagnosing an evicted pod, Jul. 16, 2019 (Jul. 16, 2019), pp. 1-5, XP055776177, URL:https://web.archive.org/web/20190716081256/https://docs.openshift.com/container-platform/3.10/dev_guide/application_ephemeral_storage_sizing.html [retrieved on Feb. 15, 2021].

(Continued)

*Primary Examiner* — Chat C Do
*Assistant Examiner* — William C Wood
(74) *Attorney, Agent, or Firm* — FINNEGAN, HENDERSON, FARABOW, GARRETT & DUNNER LLP

(57) ABSTRACT

A system for managing storage space for a computer may include at least one processor programmed to determine a maximum data space for a computing task. The at least one processor may also be programmed to create a file having a maximum size equal to or greater than the maximum data space. The at least one processor may further be programmed to create a virtual device linked to the file and mount a filesystem inside the virtual device. The at least one processor may also be programmed to mount the virtual device. The at least one processor may further be pro- (Continued)

grammed to determine that the computing task is completed. The at least one processor may further be programmed to unmount the virtual device.

27 Claims, 4 Drawing Sheets

(56) References Cited

U.S. PATENT DOCUMENTS

| | | | | |
|---|---|---|---|---|
| 2004/0221294 | A1* | 11/2004 | Kalmuk | G06F 9/544 |
| | | | | 719/312 |
| 2008/0168479 | A1* | 7/2008 | Purtell | G06F 9/45558 |
| | | | | 718/1 |
| 2011/0078679 | A1* | 3/2011 | Bozek | G06F 9/455 |
| | | | | 718/1 |
| 2015/0160884 | A1 | 6/2015 | Scales et al. | |
| 2015/0168479 | A1* | 6/2015 | Gutierrez Martinez | G01R 31/69 |
| | | | | 324/538 |
| 2020/0098082 | A1* | 3/2020 | Gutierrez | G06F 12/02 |

OTHER PUBLICATIONS

Oracle: "Chapter 5. Virtual Storage", VirtualBox Manual, Aug. 6, 2019 (Aug. 6, 2019), XP055776196, URL:https://web.archive.org/web/20190806064921/https://www.virtualbox.org/manual/ch05.html [retrieved on Feb. 15, 2021].

Peek Jerry et al., "Chapter 24 Other Ways to Get Disk Space", UNIX power tools, Aug. 1, 1997 (Aug. 1, 1997), XP055776981, GB ISBN: 978-1-56592-260-0 Retrieved from the Internet: URL:https://www.cs.ait.ac.th/-on/O/oreilly/unix/upt/ch24_03.htm [retrieved on Feb. 17, 2021].

Wikipedia: "Virtual Machine Disk Format", Oct. 14, 2019 (Oct. 14, 2019), XP055776158, Retrieved from the Internet: URL:https://en.wikipedia.org/w/index.php?title=VMDK&oldid=921194240 [retrieved on Feb. 15, 2021].

International Search Report and Written Opinion issued Feb. 26, 2021 in International Application No. PCT/IB2020/000896.

* cited by examiner

SYSTEMS AND METHODS FOR MANAGING STORAGE SPACE

CROSS REFERENCE TO RELATED PATENT APPLICATIONS AND PRIORITY

The present application is a U.S. National Stage Filing under 35 U.S.C. § 371 and claims priority from International Application No. PCT/IB2020/000896, filed on Oct. 23, 2020, which claims the benefit of priority of U.S. Provisional Application No. 62/925,385, filed Oct. 24, 2019. The entire contents of the aforementioned applications are incorporated herein by reference.

BACKGROUND

Technical Field

The present disclosure generally relates to computer systems, and more particularly to systems and methods for managing data space in a networked computing environment.

Background Information

Cloud computing has become increasingly ubiquitous, allowing computing as a service to manage a vast array of computing resources distributed over a network. Cloud computing may provide computing services such as computation, software applications, data access, data management, and storage resources to different users via a network. For example, individual terminals may send requests for running computing tasks to a server (or a server cluster) on the server. Allocating computing resources (e.g., processing power, memory, storage) for these computing tasks efficiently may be essential in order to provide sufficient computing services to users. However, allocation, enforcement, and fast cleanup of disk-space usage is not supported in many existing file systems (e.g., traditional Linux file systems). In these systems, the cleanup of written data in connection with the performance of a computing device may be achieved by using an "unlink" system call for each file and space allocation, and the cleanup needs to be performed for the whole storage device, which may be inefficient and slow.

It is thus desirable to design new methods and systems for managing data space efficiently and effectively in a networked computing environment.

SUMMARY

Embodiments consistent with the present disclosure provide systems and methods for managing data space for a computer.

In an embodiment, a system for managing storage space for a computer is provided. The system may include at least one processor programmed to determine a maximum data space for a computing task. The at least one processor may also be programmed to create a file having a maximum size equal to or greater than the maximum data space. The at least one processor may further be programmed to create a virtual device linked to the file and mount a filesystem inside the virtual device. The at least one processor may also be programmed to mount the virtual device. The at least one processor may further be programmed to determine that the computing task is completed. The at least one processor may further be programmed to unmount the virtual device.

In an embodiment, a method for managing storage space for a computer is provided. The method may include determining a maximum data space for a computing task. The method may also include creating a file having a maximum size equal to or greater than the maximum data space. The method may further include creating a virtual device linked to the anonymous file and include mount a filesystem inside the virtual device. The method may also include mounting the virtual device. The method may further include determining that the computing task is completed. The method may further include unmounting the virtual device.

In an embodiment, a non-transitory computer-readable medium storing instructions is provided. When executed by at least one processor, the instructions may cause the at least one processor to determine a maximum data space for a computing task. The instructions may further cause the at least one processor to create a file having a maximum size equal to or greater than the maximum data space. The instructions may further cause the at least one processor create a virtual device linked to the anonymous file and mount a filesystem inside the virtual device. The instructions may further cause the at least one processor to mount the virtual device. The instructions may also cause the at least one processor to determine that the computing task is completed. The instructions may further cause the at least one processor to unmount the virtual device.

BRIEF DESCRIPTION OF THE DRAWINGS

The accompanying drawings, which are incorporated in and constitute a part of this disclosure, illustrate various disclosed embodiments. In the drawings.

DETAILED DESCRIPTION

Figure 1:
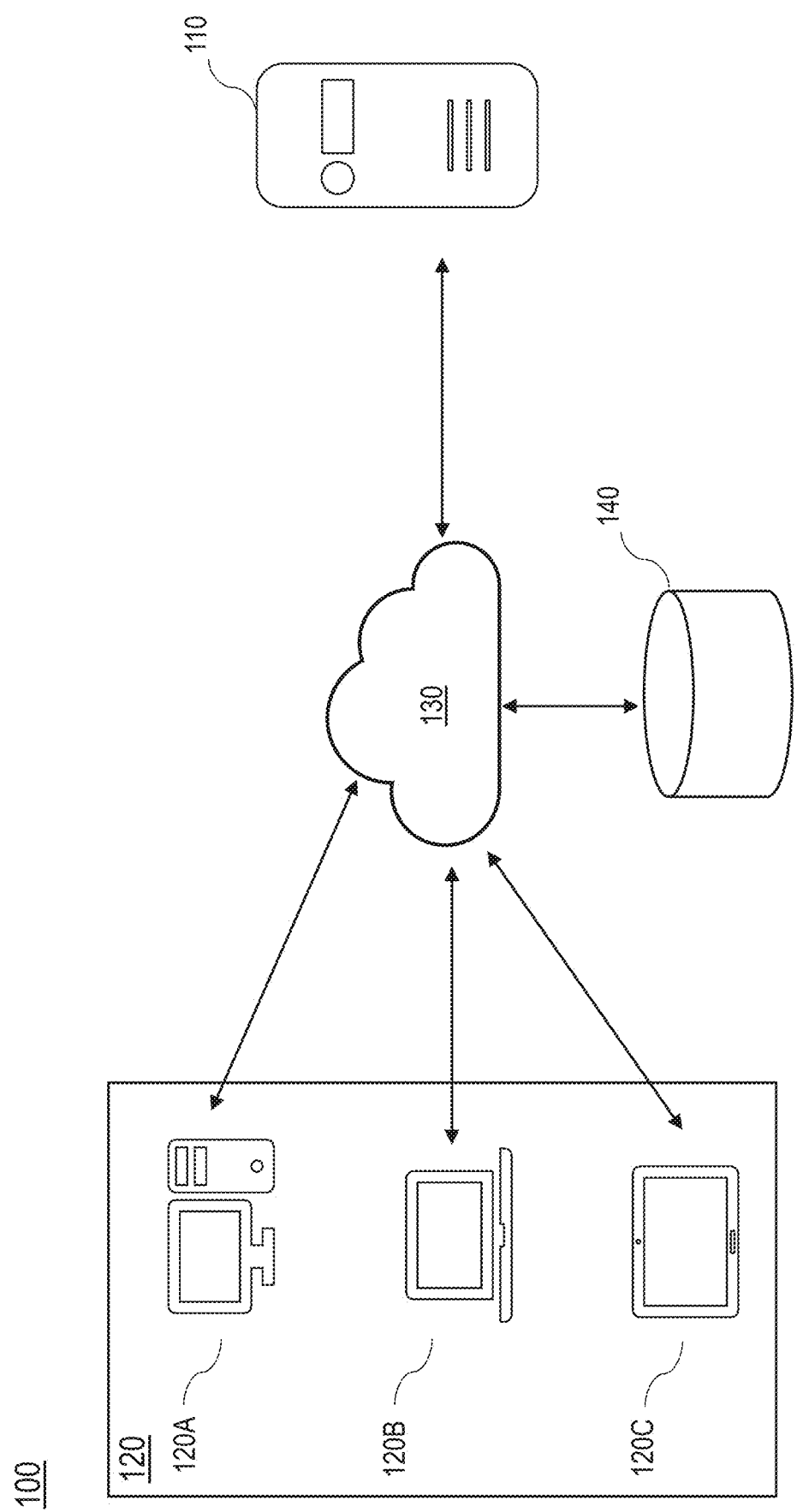
FIG. 1 is a diagrammatic representation of an exemplary system consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope is defined by the appended claims.

FIG. 1 is a diagrammatic representation of an exemplary system 100 consistent with the disclosed embodiments. As illustrated in FIG. 1, system 100 may include one or more servers 110, one or more terminals 120 (e.g., desktop terminal 120A, laptop terminal 120B, tablet terminal 120C, etc.), a network 130, and a database 140.

Server 110 may be configured to receive a request for running a computing task on server 110 (and/or another component of system 100, such as another server 110) from one or more terminals 120. A computing task may include any processing of data using computing resources, such as one or more processors, memory, storage device, network, etc. For example, terminal 120A may transmit to server 110 a request for training a machine-learning algorithm for identifying objects in images based on training samples stored in database 140. As another example, terminal 120B may transmit to server 110 a request for identifying one or more objects in an image using a trained machine-learning algorithm for identifying objects in images. Server 110 may be configured to determine a maximum data space for the computing task. For example, server 110 may determine that it may need up to one terabyte (1 TB) disk space (as the maximum data space) to complete the computing task. Server 110 may also be configured to create a file having a maximum size equal to or greater than the maximum data space. For example, server 110 may create an anonymous file having a maximum size equal to 1 TB. Server 110 may further create a virtual device linked to the file and mount the virtual device. The term "virtual device" used herein refers to a file that is generated by the system and treated as a device without reference to hardware. For example, with a Linux system, server 110 may create a loopback device linked to an anonymous file. Server 110 may also be configured to mount a filesystem into the virtual device. The filesystem may control how data is written into and read from the virtual device. Server 110 may further be configured to mount the loopback device. The term "mount" or "mounting" refers to a process by which the operating system of server 110 creates files and directories on a storage device (such as a hard drive, network drive, a virtual device) available for users to access the data stored thereon via the filesystem in the storage device. Server 110 may also be configured to run the requested computing task using the virtual device (and other computing resources such as one or more processors, memory, etc.). When the computing task is completed, server 110 may unmount the virtual device, which may release the data space occupied during the performance of the computing task. In some embodiments, server 110 may further be configured to transmit the data relating to the results of the completion (or the failure) of the computing task to terminal 120. Alternatively or additionally, server 110 may store the data relating to the results of the completion (or the failure) of the computing task in database 140, from which terminal 120 may obtain the relevant data.

For illustration purposes, below are exemplary pseudo-code routines for creating an anonymous file having a maximum size, creating a virtual device (e.g., a loop device) linked to the anonymous file, and mounting a filesystem inside the virtual device. One skilled in the art would understand that the functions (and results) achieved by the pseudo-codes below may be implemented by other codes without undue experimentation.

```
# maxFileSize: The maximum allowed storage usage for the given process
if anonymousAllowed( ) then:
    fileDescriptor := createAnonymousFile( )
else:
    fileDescriptor, fileName := createFile( )
    Unlink(fileName)
Truncate(fileDescriptor, requestedSize)
loopDevicePath := setupLoopDevice(fileDescriptor)
makeFileSystem(loopDevicePath)
#optionally, create/enter a mount namespace
mountFileSystem(loopDevicePath)
```

While FIG. 1 illustrates one server 110, one skilled in the art would understand that system 100 may include one or more servers 110 that, individually or in combination, perform the functions of server 110 disclosed in this application. For example, server 110 may constitute a cloud server group comprising two or more servers that perform the functions disclosed herein. The term "cloud server" refers to a computer platform that provides services via a network, such as the Internet. In this example configuration, server 110 may use virtual machines that may not correspond to individual hardware. For example, computational and/or storage capabilities may be implemented by allocating appropriate portions of computation/storage power from a scalable repository, such as a data center or a distributed computing environment. In one example, server 110 may implement the methods described herein using customized hard-wired logic, one or more Application Specific Integrated Circuits (ASICs) or Field Programmable Gate Arrays (FPGAs), firmware, and/or program logic which, in combination with the computer system, cause server 110 to be a special-purpose machine.

Terminal 120 may be configured to send a request for running a computing task to server 110 via, for example, network 130. A request may include data relating to the computing task to be performed. For example, a request may include one or more of an executable file, instructions, codes, scripts, commands, or an algorithm, or the like, or a combination thereof, for server 110 to run the computing task. Alternatively or additionally, the request may include data relating to one or more objects involved in the computing task. By way of example, terminal 120B may transmit to server 110 a request for identifying one or more objects in one or more images using a trained machine-learning algorithm (i.e., a computing task). The request may include the trained machine-learning algorithm to be used. Alternatively, the request may include an identity of the algorithm or a location where server 110 may obtain the algorithm. The request may also include the image(s) subject to the computing task or a location where server 110 may obtain the image(s). In some embodiments, the request may include the specification for completing or running the computing task. For example, the request may include the requested completion date and/or time, where the data relating to the results of the completion of the computing task is stored and/or transmitted, an estimated maximum data space for performing the computing task, the filesystem associated with the performance of the computing task, the type of the computing task, an estimated computing power that the computing task may need (e.g., an amount of memory, processing power, such as the type and/or the number of processors, etc.), or the like, or a combination thereof.

In some embodiments, a request may include information relating to the identity of terminal 120 and/or a user associated with terminal 120 (and/or the computing task to be performed). For example, the request may include identity information relating to the user associated with the request. Server 110 may be configured to decline or grant the request based on the identity information. As another example, server 110 may allocate the computing resources for performing the computing task based on the identity information. By way of example, server 110 may obtain information relating to the user's priority level and/or quota associated with the computing task based on the identity information (e.g., the remaining time for using computing resources in a time period (e.g., an hour, a day, a week, a month, a year, etc.)). Alternatively or additionally, server 110 may obtain information relating to specific computing resources that the user is entitled to use. Server 110 may also be configured to allocate the computing resources for performing the computing task (e.g., the types of the computing resources to be used for performing the computing task, the time period that the computing resources that the user may be allowed, etc.).

In some embodiments, terminal 120 may also be configured to receive data relating to the results of the completion (or the failure) of the computing task from server 110 and/or database 140. A terminal 120 may include a mobile communication device, such as a smartphone, mobile station (MS), terminal, cellular phone, cellular handset, personal digital assistant (PDA), smartphone, wireless phone, organizer, handheld computer, desktop computer, laptop computer, tablet computer, set-top box, television, appliance, gaming device, medical device, display device, or the like, or a combination thereof.

Network 130 may be configured to facilitate communications among the components of system 100. Network 130 may include wired and wireless communication networks, such as a local-area network (LAN), a wide-area network (WAN), a computer network, a wireless network, a telecommunications network, or the like, or a combination thereof.

Database 140 may be configured to store information and data for one or more components of system 100. For example, database 140 may store the data for server 110 to perform a computing task requested by terminal 120. For example, as described above, terminal 120A may transmit a request for training a machine-learning algorithm to identify objects in images based on training samples, which may be stored in database 140. Server 110 may obtain from database 140 the training samples via network 130. As another example, server 110 may store in database 140 data relating to the results of the completion (or the failure) of the computing task.

Figure 2:
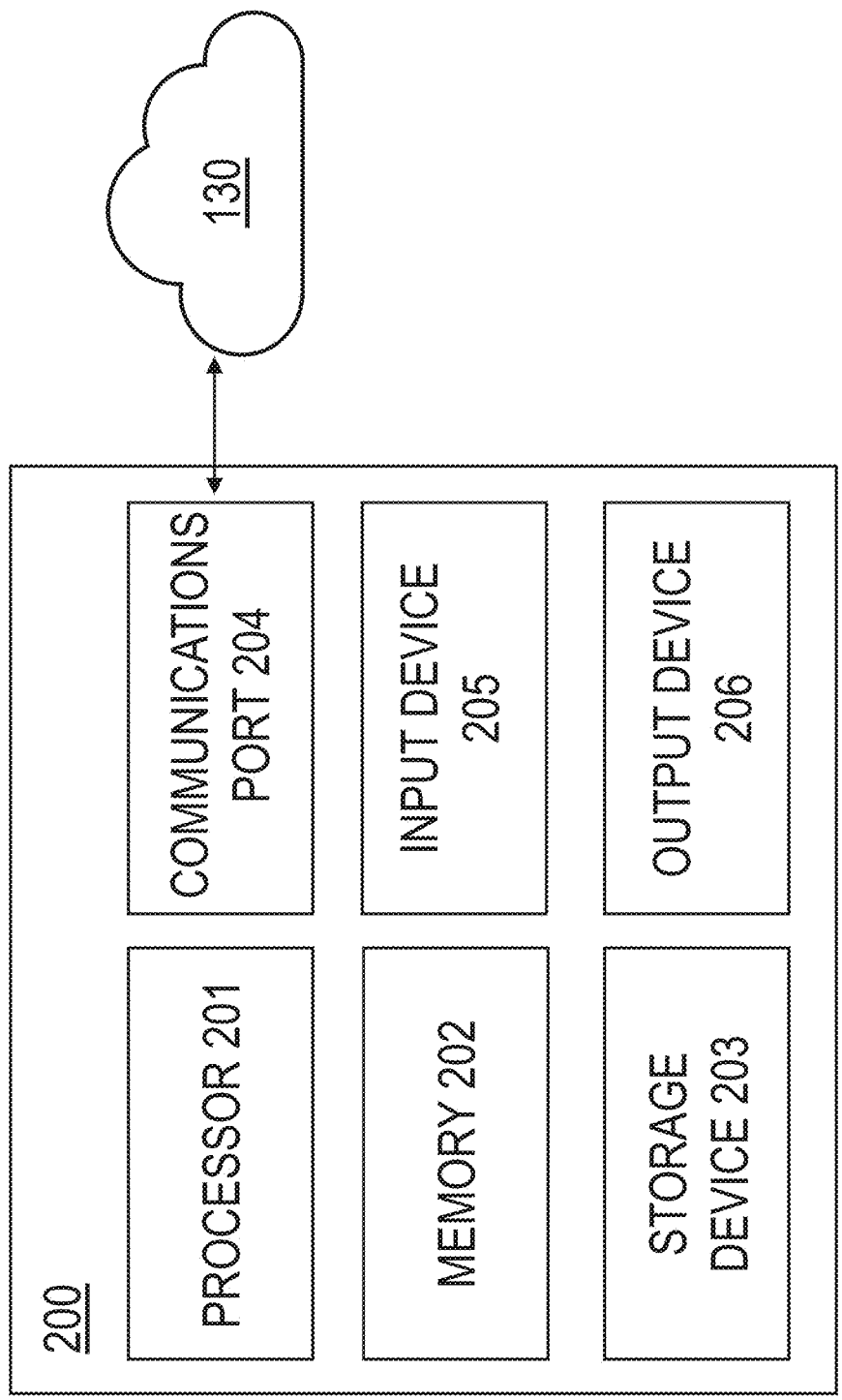
FIG. 2 is an exemplary block diagram of an exemplary server consistent with the disclosed embodiments.

FIG. 2 is a block diagram of an exemplary computing device 200 consistent with the disclosed embodiments. Server 110 and/or terminal 120 may be implemented based on the architecture of computing device 200. For example, server 110 may include one or more components of computing device 200 configured to perform its functions disclosed in this application. As illustrated in FIG. 2, computing device 200 may include at least one processor (e.g., processor 201), a memory 202, at least one storage device (e.g., storage device 203), a communications port 204, an input device 205, and an output device 206.

Processor 201 may be configured to perform one or more functions of server 110 and/or terminal 120 described in this application. Processor 201 may include a microprocessor, preprocessors (such as an image preprocessor), a graphics processing unit (GPU), a central processing unit (CPU), support circuits, digital signal processors, integrated circuits, memory, or any other types of devices suitable for running applications or performing a computing task. In some embodiments, processor 201 may include any type of single or multi-core processor, mobile device microcontroller, central processing unit, etc. Various processing devices may be used, including, for example, processors available from manufacturers such as Intel®, AMD®, etc., or GPUs available from manufacturers such as NVIDIA®, ATI®, etc. and may include various architectures (e.g., x86 processor, ARM®, etc.). Any of the processing devices disclosed herein may be configured to perform certain functions. Configuring a processing device, such as any of the described processors or other controller or microprocessor, to perform certain functions may include programming of computer-executable instructions and making those instructions available to the processing device for execution during operation of the processing device. In some embodiments, configuring a processing device may include programming the processing device directly with architectural instructions. For example, processing devices such as field-programmable gate arrays (FPGAs), application-specific integrated circuits (ASICs), and the like may be configured using, for example, one or more hardware description languages (HDLs).

Computing device 200 may also include a memory 202 that may store instructions for various components of computing device 200. For example, memory 202 may store instructions that, when executed by processor 201, may be configured to cause processor 201 to perform one or more functions described herein. Memory 202 may include any number of random-access memories, read-only memories, flash memories, disk drives, optical storage, tape storage, removable storage, and other types of storage. In one instance, memory 202 may be separate from processor 201. In another instance, memory 202 may be integrated into processor 201. In some embodiments, memory 202 may include software for performing one or more computing tasks, as well as a trained system, such as a neural network, or a deep neural network, for example.

Storage device 203 may be configured to store various data and information for one or more components of computing device 200. For example, processor 201 may write data relating to a computing task into storage device 203, and read data relating to the computing task from storage device 203. As another example, processor 201 may reside on server 110 and may be configured to manage data space on storage device 203. By way of example, processor 201 may be configured to reserve data space of storage device 203 for the performance of a computing task and release the reversed data space after the computing task is completed (or interrupted). Storage device 203 may include one or more hard drives, tapes, one or more solid-state drives, any device suitable for writing and read data, or the like, or a combination thereof.

Communications port 204 may be configured to facilitate data communications between computing device 200 and one or more components of system 100 via network 130. For example, server 110 may include communications port 204 configured to receive a request for running a computing task from terminal 120 via network 130.

Input device 205 may be configured to receive input from the user of computing device 200, and one or more components of computing device 200 may perform one or more functions in response to the input received. In some embodiments, input device 205 may include an interface displayed on a touchscreen (e.g., output device 206). Output device 206 may be configured to output information and/or data to the user. For example, output device 206 may include a display configured to display the information relating to the results of the completion of a computing task.

Figure 3:
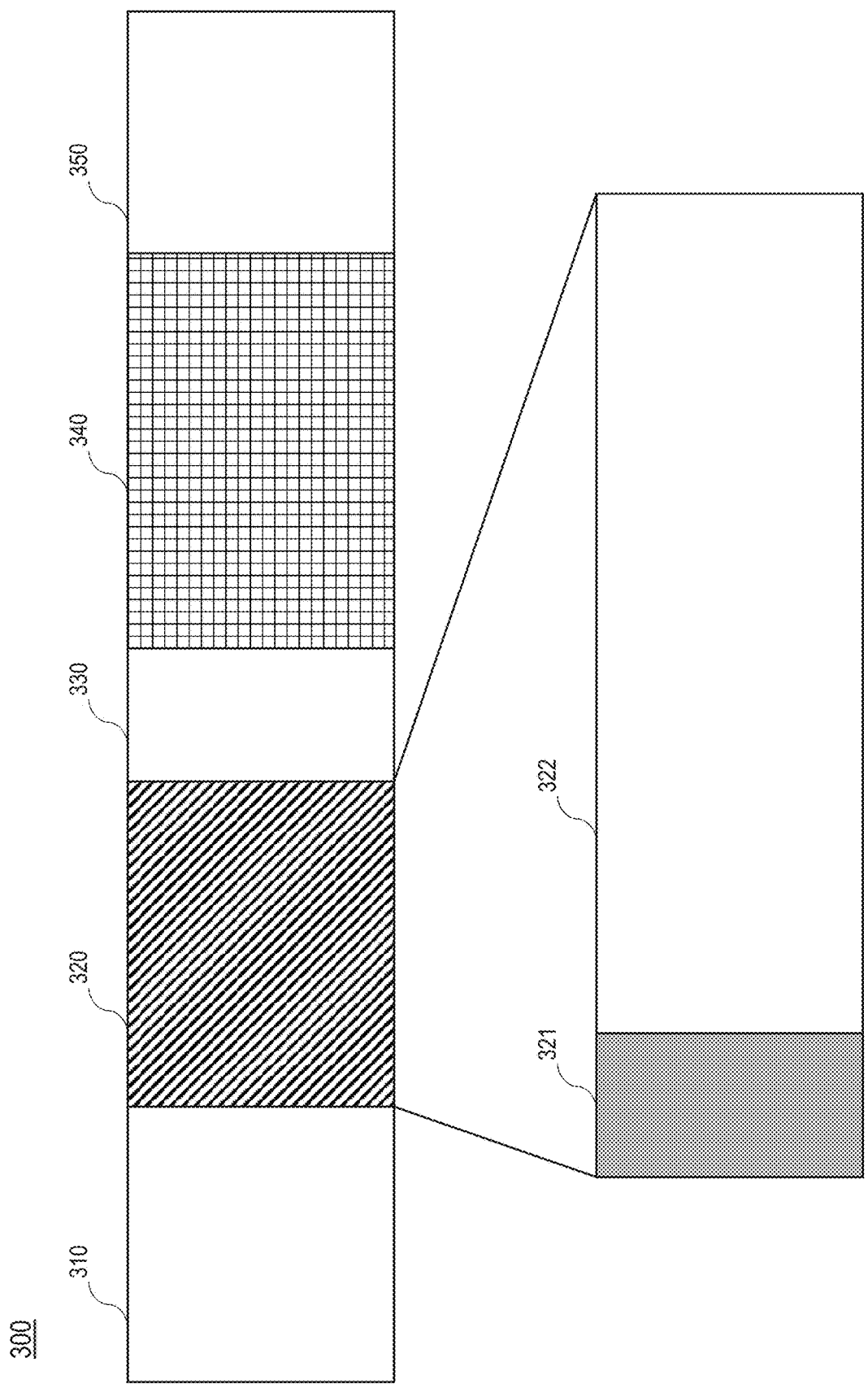
FIG. 3 is a diagrammatic representation of an exemplary storage space consistent with the disclosed embodiments.

FIG. 3 is a diagrammatic representation of an exemplary storage space 300 consistent with the disclosed embodiments. Server 110 may be configured to manage storage space 300 for performing one or more computing tasks. For example, server 110 may be configured to create an anonymous file having a maximum size for running a computing task, and create a virtual device linking the anonymous file. Server 110 may also be configured to mount the created virtual device and perform the computing task using the data space in the virtual device.

Storage space 300 may be a portion of the storage space of storage device 203 of server 110. For example, server 110 may create an anonymous file in data space 320. The size of the anonymous file may change (e.g., increase or decrease in size) during the performance of the computing task, but may not exceed a maximum size that may remain a predetermined size. For illustration purposes, the maximum size of the anonymous file may equal the size of data space 320 illustrated in FIG. 3. While the maximum size of the anonymous file is shown as data space 320 in FIG. 3, one skilled in the art would understand that the data of the anonymous file may be written in other portions of storage space 300 (e.g., in free space 310, free space 330, free space 350, and/or data space 240 (if available)). The total data space of the anonymous file, however, may not exceed the maximum size (i.e., the area represented by data space 320). Server 110 may also be configured to mount a filesystem inside the virtual device. For example, as illustrated in FIG. 3, server 110 may mount a filesystem having a size covering data space 321. Server 110 may also be configured to written data into data space 322 when performing the computing task. While available space for writing data during the performance of the computing task is shown as data space 322 in FIG. 3, one skilled in the art would understand that the data of the anonymous file may be written in other portions of storage space 300 (e.g., in free space 310, free space 330, and/or data space 240 (if available)). The total data space of the data written during the performance of the computing task, however, may not exceed the maximum size (i.e., the area covering data space 320) minus the data space occupied by the mounted filesystem inside the virtual device. When the computing task is completed, server 110 may unmount the virtual device and release the data space occupied by the anonymous file (e.g., data space 320 or the occupied portion thereof) by, for example, deleting all references to the file descriptor of the anonymous file, which may turn the data in the data space into free space. Server 110 may further use the released data space for another computing task.

In some embodiments, rather than immediately allocating data space for a computing task, server 110 may allocate data space for the computing task in storage space 300 when data is actually written to the virtual device (and the anonymous file). Alternatively, the data space equal to the maximum size of the anonymous file (e.g., data space 320) may be allocated for the computing task when the anonymous file is created.

In some embodiments, server 110 may manage data space of storage space 300 for two or more computing tasks. For example, as illustrated in FIG. 3, server 110 may create another anonymous file for another computing task, which may have a maximum space equal to the size of data space 340.

Figure 4:
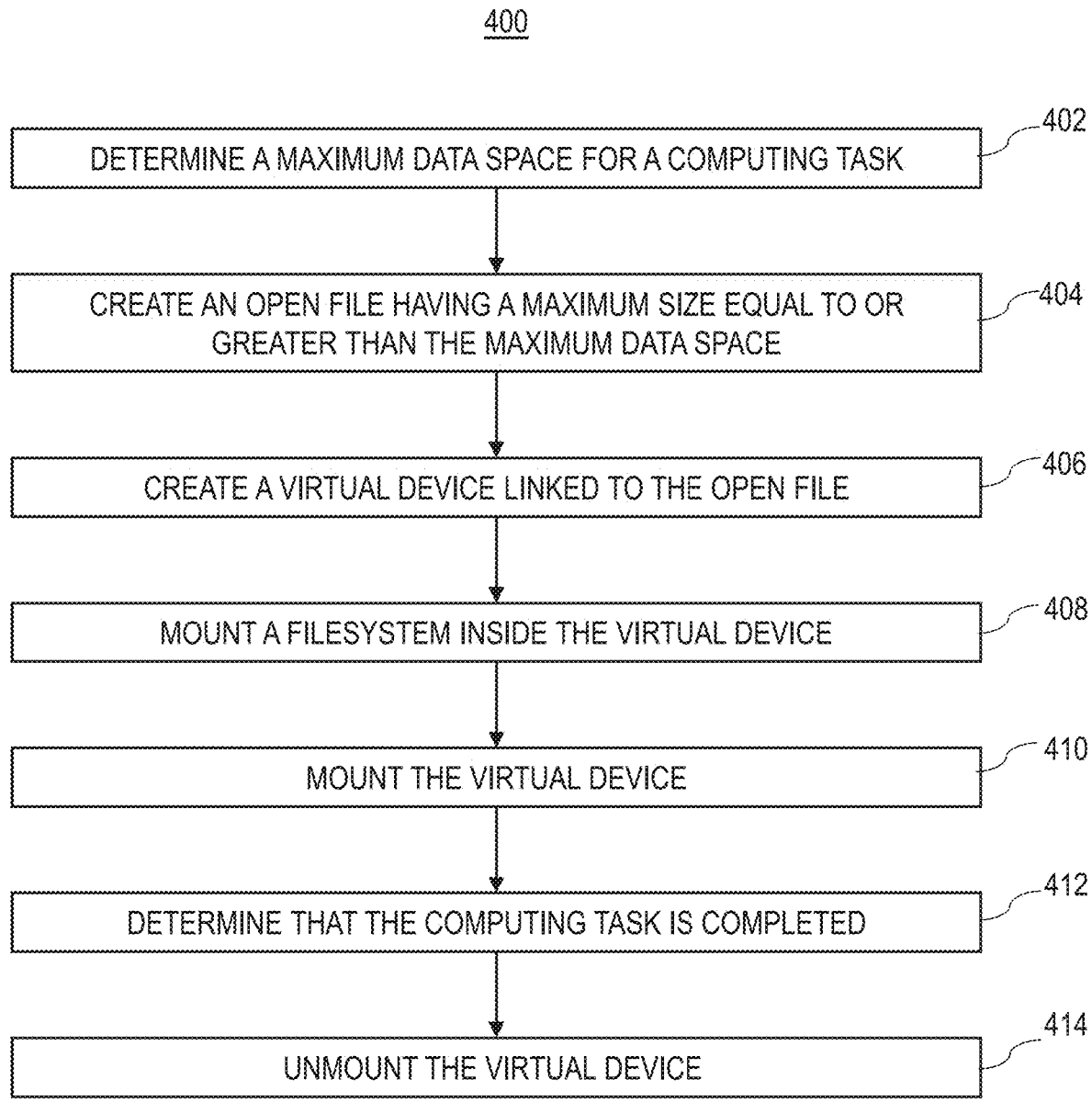
FIG. 4 is a flowchart showing an exemplary process for managing storage space for a computer consistent with disclosed embodiments.

FIG. 4 is a flowchart showing an exemplary process 400 for managing storage space for a computer consistent with disclosed embodiments. The steps illustrated in FIG. 4 are exemplary and steps may be added, repeated, modified, performed sequentially, performed in parallel, and/or deleted in some embodiments.

At step 402, server 110 may be configured to determine a maximum data space for a computing task. For example, server 110 may receive a request for running a computing task on server 110 (or another server) from a user device (e.g., a terminal 120). A computing task may include any processing of data using computing resources, such as one or more processors, memory, storage device, network, etc. Server 110 may determine a maximum data space for the computing task.

In some embodiments, server 110 may determine the maximum data space based on one or more characteristics of the computing task. Exemplary characteristics of a computing task may include the type of the computing task (e.g., processing a large amount of data or a relatively small amount of data), computing resources to be used (e.g., processing power, memory usage, storage usage) for performing the computing task, or the like, or a combination thereof. For example, server 110 may receive from terminal 120A a first request for running a first computing task for training a machine-learning algorithm for identifying objects in images based on thousands (or millions) of training samples. Server 110 may also receive from terminal 120B a second request for running a second computing task for identifying one or more objects in an image using a trained machine-learning algorithm for identifying objects in images. Server 110 may determine a first maximum data space for the first computing task. Server 110 may also determine a second maximum data space for the second computing task, which may be smaller than the first maximum data space. Alternatively or additionally, server 110 may determine a maximum data space for a computing task based on information relating to the maximum data space for similar computing tasks performed in the past. Alternatively or additionally, server 110 may determine a maximum data space for a computing task based, at least in part, on the received request. For example, a request received from the user device may include the specification for completing or running the computing task. For example, the request may include the requested completion date and/or time, where the data relating to the results of the completion of the computing task is stored and/or transmitted, an estimated maximum data space for performing the computing task, the filesystem associated with the performance of the computing task, the type of the computing task, an estimated computing power that the computing task may need (e.g., an amount of memory, processing power, such as the type and/or the number of processors, etc.), or the like, or a combination thereof. By way of example, server 110 may determine the maximum data space for a computing task based on the estimated maximum data space for performing the computing task included in the request (e.g., set the estimated maximum data space as the maximum data space). Alternatively or additionally, server 110 may determine the maximum data space based on a quota associated with the user device or an identifier of a user associated with the user device. For example, a request may include information relating to the identity of terminal 120 and/or a user associated with terminal 120 (and/or the computing task to be performed). Server 110 may obtain information relating to a quota associated with the computing task (e.g., the data space that the user and/or the user device may use for a computing task, the remaining time for using computing resources in a time period (e.g., an hour, a day, a week, a month, a year, etc.)) based on the identity information.

At step 404, server 110 may be configured to create a file having a maximum size equal to or greater than the maximum data space. In some embodiments, the file may include an anonymous file or an open but unlinked file. For example, server 110 may create an anonymous file using codes similar to the following pseudo-codes (in a Linux system):

```
if anonymousAllowed( ) then:
    fileDescriptor := createAnonymousFile( )
else:
    fileDescriptor, fileName := createFile( )
Unlink(fileName)
Truncate(fileDescriptor, requestedSize)
```

The truncate function may cause the file to be truncated to a size of "requestedSize" bytes, which is the maximum size of the file.

In some embodiments, server 110 may also unlink the file using a "unlink" function (as illustrated above as "Unlink (fileName)"), which may create an open but unlinked file. Server 110 may further create a virtual device linked to the open but unlinked file.

At step 406, server 110 may be configured to create a virtual device linked to the file, and at step 408, server 110 may be configured to mount the virtual device. For example, server 110 may create and mount a virtual device (e.g., a loopback device in a Linux system) linked to the file created at step 404, by using, for example, the following pseudo-codes: loopDevicePath:=setupLoopDevice(fileDescriptor).

In some embodiments, server 110 may create the virtual device in a container, which may be a set of one or more processes that are isolated from the rest of the host system. A container may include one or more applications, services, supporting files, and/or runtime needed for running a computing task.

At step 410, server 110 may be configured to mount a filesystem inside the virtual device. For example, server 110 may create and mount a filesystem inside the virtual device using codes similar to the following pseudo-codes:

```
makeFileSystem(loopDevicePath)
#optionally, create/enter a mount namespace
mountFileSystem(loopDevicePath)
```

In some embodiments, server 110 may determine the filesystem to be mounted based, at least in part, on the received request. For example, the request received from the user device may specify the filesystem needed for running the computing task, and server 110 may create and mount the filesystem that is specified by the request inside the virtual device. Alternatively, server 110 may be configured to determine the filesystem based on one or more characteristics of the computing task. As described elsewhere in this disclosure, exemplary characteristics of a computing task may include the type of the computing task (e.g., processing a large amount of data or a relatively small amount of data), computing resources to be used (e.g., processing power, memory usage, storage usage) for performing the computing task, or the like, or a combination thereof. Server 110 may be configured to determine the filesystem based on the type of the computing task and/or the computing resources to be used.

In some embodiments, server 110 may run the computing task using the virtual device. Alternatively, server 110 may instruct another server 110 or computer device to run the computing task. In some embodiments, server 110 may be configured to run the computing task in a container.

At step 412, server 110 may be configured to determine that the computing task is completed. At step 414, server 110 may be configured to unmount the virtual device. In some embodiments, server 110 may be configured to automatically unmount the virtual device when the computing task is completed. For example, the kernel of the operating system may be configured to automatically unmount the virtual device when the computing task is completed.

In some embodiments, server 110 may be configured to unmount the filesystem after the computing task is completed.

In some embodiments, server 110 may be configured to, after the computing task is completed, close a file descriptor associated with the anonymous file to release data space associated with the computing task.

In some embodiments, server 110 may receive a first request for running a first computing task from a first user device (e.g., terminal 120A) and receive a second request for running a second computing task from a second user device (e.g., terminal 120B). For example, server 110 may receive from terminal 120A a first request for running a first computing task for training a machine-learning algorithm to identify one or more objects in images using training samples. Server 110 may also receive from terminal 120B a request for identifying one or more objects in an image using a trained machine-learning algorithm. Server 110 may be configured to determine a first maximum data space for the first computing task and a second maximum data space for the second computing task. In some embodiments, the first maximum data space may be the same as the second maximum data space. Alternatively, the first maximum data space may be different from the second maximum data space. Server 110 may further be configured to create a first file having a first maximum size equal to or greater than the first maximum data space, and create a second file having a second maximum size equal to or greater than the second maximum data space. Server 110 may also be configured to create a first virtual device linked to the first anonymous file, and create the second virtual device linked to the second anonymous file. In some embodiments, the second virtual device may be different from the first virtual device. Server 110 may further be configured to mount a first filesystem inside the first virtual device and mount a second filesystem inside the second virtual device. In some embodiments, the first filesystem may be the same as the second filesystem. Alternatively, the first filesystem may be different from the second filesystem. Server 110 may also be configured to determine that the first computing task is completed and unmount the first virtual device. Server 110 may further be configured to determine the second computing task is completed and unmount the second virtual device.

In some embodiments, server 110 may create the first virtual device in a first container and create the second virtual device in a second container. The first container and the second container may be the same. Alternatively, the first container and the second container may be different.

In some embodiments, server 110 may run the first computing task and the second computing task simultaneously. The term "simultaneously" as used herein means that the time period of running a first computing task and the time period of running a second computing task at least partially overlap. Alternatively, server 110 may run the first computing task and the second computing task at different times (i.e., the time period of running a first computing task and the time period of running a second computing task do not overlap).

In some embodiments, server 110 may divide a computing job into a plurality of computing tasks, including the first computing task and the second computing task. For example, server 110 may receive a request for training a machine-learning algorithm to identify one or more objects in images using a plurality of training samples (which is a computing job in this example). Server 110 may divide the training process into a first computing task for training the machine-learning algorithm using a first group of the training samples and a second computing task for training the machine-learning algorithm using a second group of the training samples. In some embodiments, server 110 may run the first computing task and the second computing task simultaneously. For example, server 110 may run the first computing task to generate a first machine-learning algorithm based on the first group of the training samples, and run the second computing task to generate a second machine-learning algorithm. Server 110 may select a better one between the two algorithms using a set of testing samples. Alternatively, server 110 may run the first computing task and the second computing task at different times. In some embodiments, server 110 run the first computing task and the second computing task sequentially. For example, server 110 may run the first computing task first using the first group of training samples to generate a first machine-learning algorithm, and run the second computing task to re-train the first machine-learning algorithm using the second group of training samples.

The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, 4K Ultra HD Blu-ray, or other optical drive media.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A system for managing storage space for a computer, the system comprising:
at least one processor programmed to:
determine a first maximum data space for a first computing task and a second maximum data space for a second computing task, the second computing task being different from the first computing task, and the second maximum data space being different from the first maximum data space;
create a first file having a first maximum size equal to or greater than the first maximum data space and a second file having a second maximum size equal to or greater than the second maximum data space;
create a first virtual device linked to the first file and a second virtual device linked to the second file, the second virtual device being different from the first virtual device;
mount a first filesystem inside the first virtual device and a second filesystem inside the second virtual device;
mount the first virtual device and the second virtual device;
determine that the first computing task and the second computing task are completed; and
unmount the first virtual device and the second virtual device,
wherein the at least one processor is further programmed to, after the first computing task and the second computing task are completed, close a first file descriptor associated with the first file and a second file descriptor associated with the second file to release data space associated with the first computing task and the second computing task,
wherein creating the first virtual device and the second virtual device comprise creating the first virtual device in a first container and creating the second virtual device in a second container, and
wherein the at least one processor is further programmed to run the first computing task in the first container and the second computing task in the second container.

2. The system of claim 1, wherein the first virtual device and the second virtual device are loopback devices.

3. The system of claim 1, wherein the at least one processor is further programmed to run the first computing task and the second computing task using the first virtual device and the second virtual device, respectively.

4. The system of claim 1, wherein the at least one processor is further programmed to determine the first maximum data space and the second maximum data space based on one or more characteristics of the first computing task and the second computing task, respectively.

5. The system of claim 1, wherein the at least one processor is further programmed to determine the first filesystem and the second filesystem based on one or more characteristics of the first computing task and the second computing task, respectively.

6. The system of claim 1, wherein the at least one processor is further programmed to receive one or more requests to run the first computing task and the second computing task from one or more user devices.

7. The system of claim 6, wherein the at least one processor is further programmed to determine the first filesystem and the second filesystem based, at least in part, on the received one or more requests.

8. The system of claim 6, wherein the at least one processor is further programmed to determine the first maximum data space and the second maximum data space based, at least in part, on the received one or more requests.

9. The system of claim 6, wherein the at least one processor is further programmed to determine the first maximum data space and the second maximum data space based on one or more quotas associated with the one or more user devices or one or more identifiers of one or more users associated with the one or more user devices.

10. The system of claim 1, wherein the first file and the second file are anonymous files or open unlinked files.

11. The system of claim 1, wherein the at least one processor is further programmed to run the first computing task and the second computing task simultaneously.

12. The system of claim 1, wherein the at least one processor is further programmed to run the first computing task and the second computing task at different times.

13. The system of claim 1, wherein the first filesystem is different from the second filesystem.

14. The system of claim 1, wherein the at least one processor is further programmed to divide a computing job into a plurality of sub-tasks, wherein the plurality of sub-tasks include the first computing task.

15. The system of claim 14, wherein:
the plurality of sub-tasks include the second computing task; and
the at least one processor is further programmed to run the first computing task and the second computing task simultaneously.

16. The system of claim 14, wherein:
the plurality of sub-tasks include the second computing task; and
the at least one processor is further programmed to run the first computing task and the second computing task at different times.

17. The system of claim 16, wherein the at least one processor is further programmed to run the first computing task and the second computing task sequentially.

18. The system of claim 1, wherein the at least one processor is further programmed to unmount the first filesystem and the second filesystem when the first computing task and the second computing task are completed.

19. The system of claim 1, wherein the at least one processor is further programmed to unlink the first file, wherein creating the first virtual device linked to the first file comprises creating the first virtual device linked to the unlinked file.

20. A method for managing storage space for a computer, the method comprising:
determining a first maximum data space for a first computing task and a second maximum data space for a second computing task, the second computing task being different from the first computing task, and the second maximum data space being different from the first maximum data space;
creating a first anonymous file having a first maximum size equal to or greater than the first maximum data space and a second anonymous file having a second maximum size equal to or greater than the second maximum data space;
creating a first virtual device linked to the first anonymous file and a second virtual device linked to the second anonymous file, the second virtual device being different from the first virtual device;
mounting a first filesystem inside the first virtual device and a second filesystem inside the second virtual device;
mounting the first virtual device and the second virtual device;
determining that the first computing task and the second computing task are completed; and
unmounting the first virtual device and the second virtual device,
wherein the method further comprises, after the first computing task and the second computing task are completed, closing a first file descriptor associated with the first file and a second file descriptor associated with the second file to release data space associated with the first computing task and the second computing task,
wherein creating the first virtual device and the second virtual device comprise creating the first virtual device in a first container and creating the second virtual device in a second container, and
wherein the method further comprises running the first computing task in the first container and the second computing task in the second container.

21. A non-transitory computer-readable medium storing instructions that, when executed by at least one processor, cause the at least one processor to:
determine a first maximum data space for a first computing task and a second maximum data space for a second computing task, the second computing task being different from the first computing task, and the second maximum data space being different from the first maximum data space;
create a first anonymous file having a first maximum size equal to or greater than the maximum data space and a second anonymous file having a second maximum size equal to or greater than the second maximum data space;
create a first virtual device linked to the first anonymous file and a second virtual device linked to the second anonymous file, the second virtual device being different from the first virtual device;
mount a first filesystem inside the first virtual device and a second filesystem inside the second virtual device;
mount the first virtual device and the second virtual device;
determine that the first computing task and the second computing task are completed; and
unmount the first virtual device and the second virtual device,
wherein the instructions further cause the processor to, after the first computing task and the second computing task are completed, close a first file descriptor associated with the first file and a second file descriptor associated with the second file to release data space associated with the first computing task and the second computing task,
wherein creating the first virtual device and the second virtual device comprise creating the first virtual device in a first container and creating the second virtual device in a second container, and
wherein the instructions further cause the processor to run the first computing task in the first container and the second computing task in the second container.

22. The method of claim 20, further comprising:
closing, after the first computing task and the second computing task are completed, a first file descriptor associated with the first file and a second file descriptor associated with the second file to release data space associated with the first computing task and the second computing task.

23. The method of claim 20, further comprising:
dividing a computing job into a plurality of sub-tasks, wherein the plurality of sub-tasks include the first computing task.

24. The method of claim 23, wherein the plurality of sub-tasks include the second computing task, and the method further comprises: running the first computing task and the second computing task simultaneously.

25. The non-transitory computer-readable medium of claim 21, wherein the instructions, when executed by the at least one processor, further cause the at least one processor to:
close, after the first computing task and the second computing task are completed, a first file descriptor associated with the first file and a second file descriptor associated with the second file to release data space associated with the first computing task and the second computing task.

26. The non-transitory computer-readable medium of claim 21, wherein the instructions, when executed by the at least one processor, further cause the at least one processor to, further comprising:
divide a computing job into a plurality of sub-tasks, wherein the plurality of sub-tasks include the first computing task.

27. The non-transitory computer-readable medium of claim 26, wherein the plurality of sub-tasks include the second computing task, and wherein the instructions, when executed by the at least one processor, further cause the at least one processor to:
run the first computing task and the second computing task simultaneously.

* * * * *